United States Patent [19]

Gomersall

[11] Patent Number: 4,630,108
[45] Date of Patent: Dec. 16, 1986

[54] PREPROGRAMMED OVER-THE-AIR MARKETING RESEARCH SYSTEM

[75] Inventor: Earl R. Gomersall, Inverness, Ill.

[73] Assignee: A. C. Nielsen Company, Northbrook, Ill.

[21] Appl. No.: 593,596

[22] Filed: Mar. 26, 1984

[51] Int. Cl.[4] .................... H04N 17/04; H04H 9/00
[52] U.S. Cl. ........................... 358/84; 455/2; 455/4
[58] Field of Search ............... 179/2 AS; 358/84, 86; 455/2, 3, 4, 5, 6

[56] References Cited

U.S. PATENT DOCUMENTS

| | | | |
|---|---|---|---|
| 3,366,731 | 1/1968 | Wallerstein | 358/86 |
| 3,639,686 | 2/1972 | Walker et al. | 358/86 X |
| 4,112,464 | 9/1978 | Gulf et al. | |
| 4,170,782 | 10/1979 | Miller | 358/84 |
| 4,264,924 | 4/1981 | Freeman | 358/86 |
| 4,264,925 | 4/1981 | Freeman | 358/86 |
| 4,331,973 | 5/1982 | Eskin et al. | 455/2 X |
| 4,331,974 | 5/1982 | Cogswell et al. | 455/2 X |
| 4,355,372 | 10/1982 | Johnson et al. | 179/2 AS X |
| 4,361,851 | 11/1982 | Asip et al. | 358/84 |
| 4,404,589 | 9/1983 | Wright, Jr. | 358/86 |
| 4,503,288 | 3/1985 | Kessler | 179/5 P X |
| 4,507,680 | 3/1985 | Freeman | 358/86 |
| 4,536,791 | 8/1985 | Campbell et al. | 358/84 X |
| 4,546,382 | 10/1985 | McKenna et al. | 358/84 |
| 4,566,030 | 1/1986 | Nickerson et al. | 358/84 |
| 4,573,072 | 2/1986 | Freeman | 358/86 |

FOREIGN PATENT DOCUMENTS

| | | | |
|---|---|---|---|
| 103438 | 3/1984 | European Pat. Off. | 358/86 |
| 128481 | 12/1984 | European Pat. Off. | 358/84 |
| WO81/02961 | 10/1981 | PCT Int'l Appl. | 358/147 |

Primary Examiner—Keith E. George
Attorney, Agent, or Firm—Mason, Kolehmainen, Rathburn & Wyss

[57] ABSTRACT

A preprogrammed over-the-air marketing research system includes transmission facilities for delivering a regularly scheduled television signal and a low power, microwave transmitter or satellite transponder for delivering a special over-the-air television signal, including substitute programming, to cooperating households. Each household has an antenna for receiving the special television signal, a down converter and a television control unit that includes a small household stored program computer. The computer receives in advance and stores a substitute programming schedule and other instructions for a broadcast period from a command and control computer, records the "on-off" condition of the television receiver and the channel being watched, and controls the condition of a three-way switch that enables members of a particular household to view the normal television signal or substitute programming from the special television signal or text or music from the household computer in accordance with the stored schedule. In this manner, the command and control computer establishes test panels consisting of one or more cooperating households in advance by instructions transmitted to each household computer by the command and control computer. Responses of cooperating households to marketing research tests may be obtained from automatic household purchasing response apparatus installed in each cooperating household or from cooperating retail stores and are transmitted to the command and control computer for analysis.

57 Claims, 5 Drawing Figures

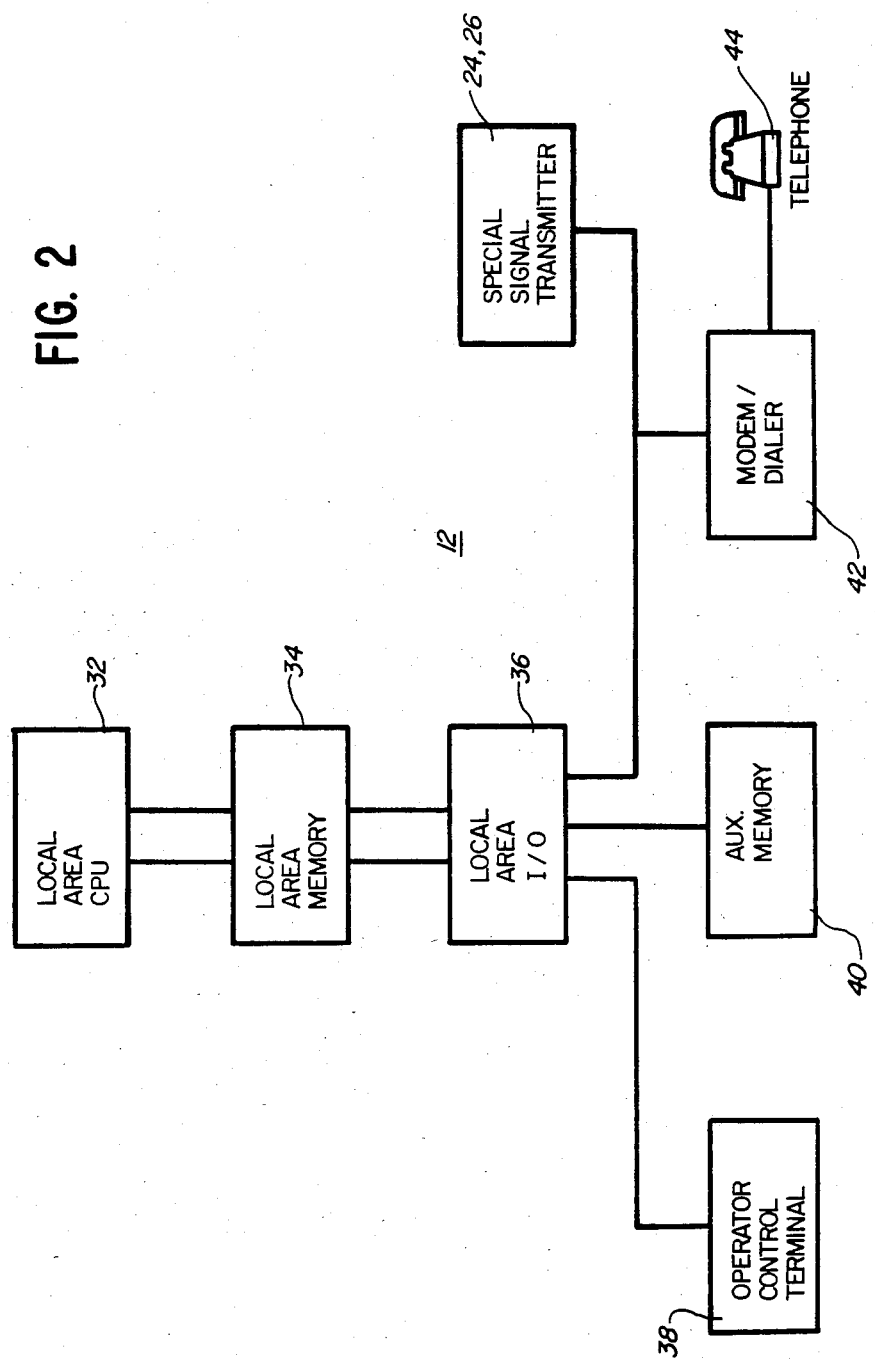

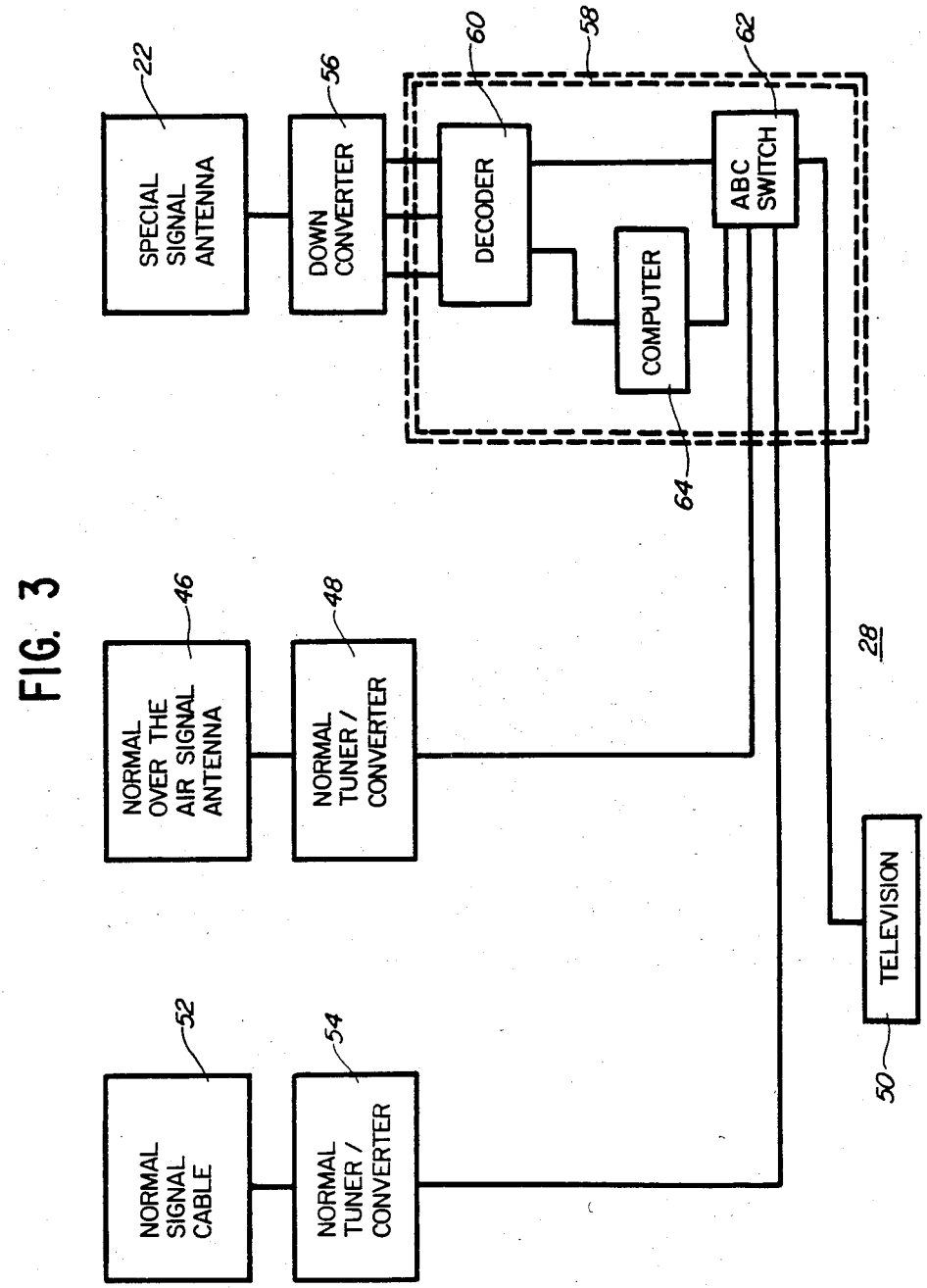

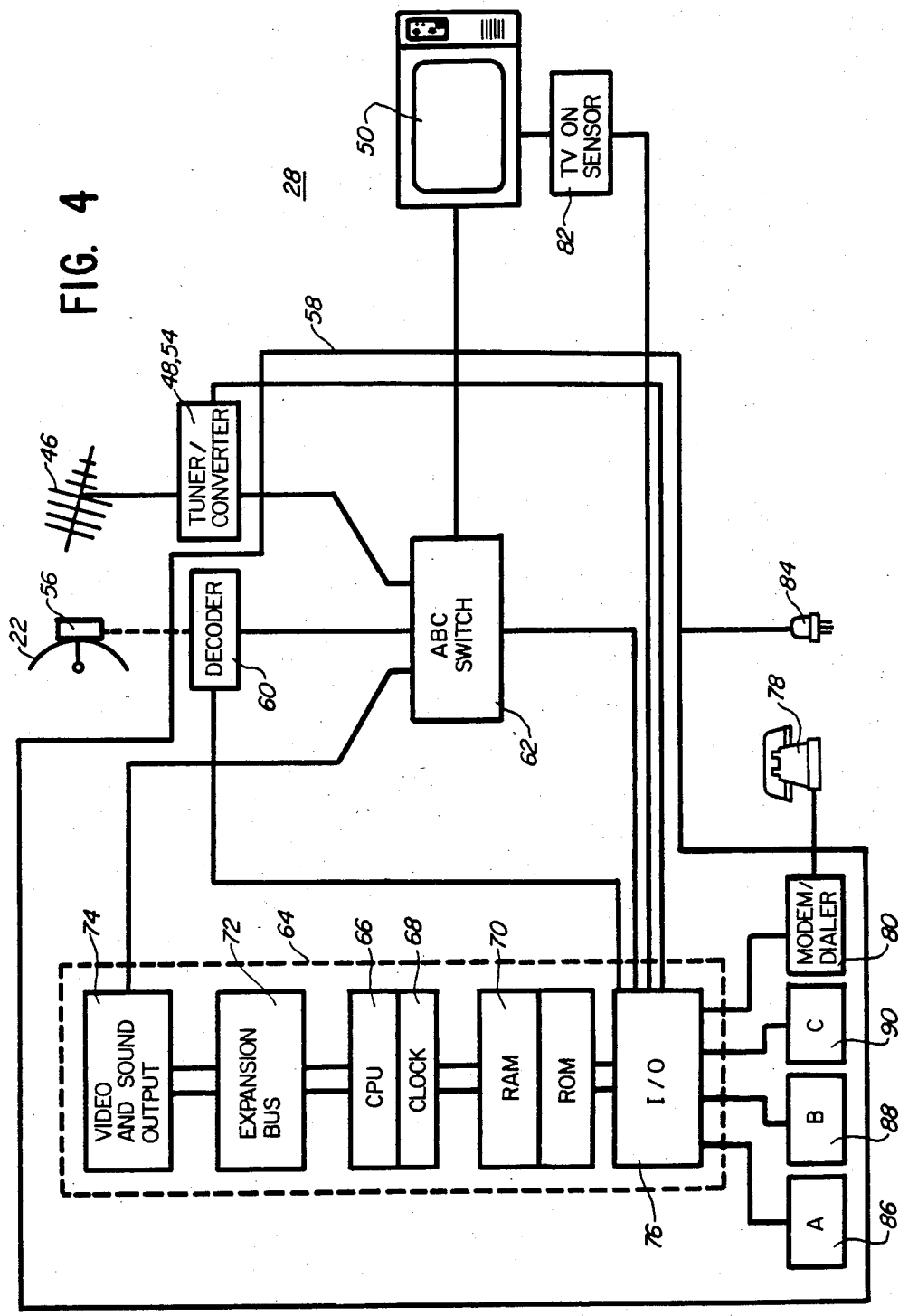

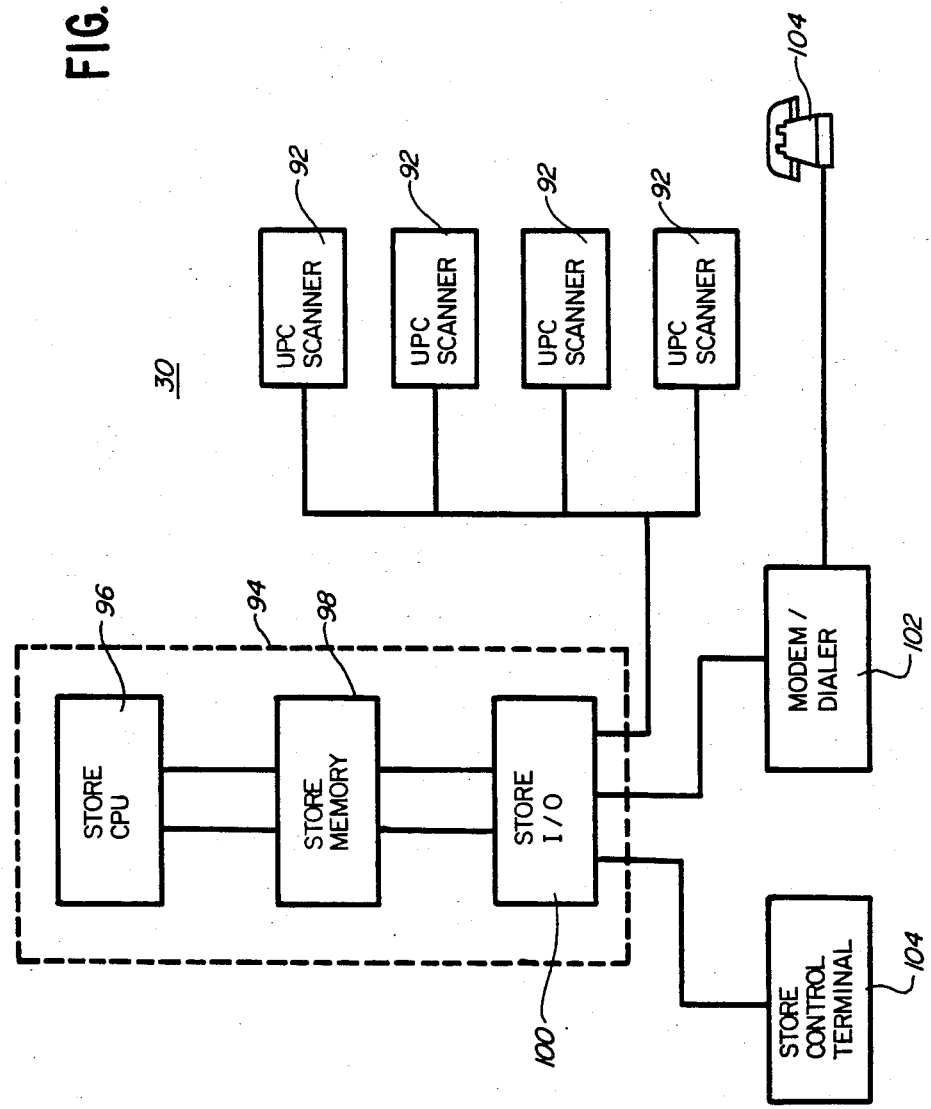

PREPROGRAMMED OVER-THE-AIR MARKETING RESEARCH SYSTEM

BACKGROUND OF THE INVENTION

A. Field of the Invention

The device of the present invention generally relates to systems and methods for performing marketing research in a targeted test area and, more particularly, to a system and method for performing over-the-air marketing research in households having television sets in the targeted test area.

B. Description of the Prior Art

The monitoring of the activity of television sets in cooperating households for various purposes is old and well known. Typically, cooperating households having television sets are furnished with a diary to be filled out by those people who watch television in the households. This method has several limitations including lack of attention and human error in making diary entries. Other systems have been designed to automatically monitor the activity of television receivers in cooperating households, that is, the "on-off" condition of the television receivers and the identity of the channels being viewed, to store such information accumulated during an entire broadcast day in a small computer installed in each cooperating household and properly to organize or format such information for transmission at the end of a broadcast day over telephone lines to a central computer. Examples of such systems are set forth in U.S. Pat. Nos. 3,651,471; 3,742,462; 3,742,463; 3,772,649; 3,973,206; 4,025,851; and 4,048,562. Such systems, however, lack flexibility in that they do not provide for the testing of viewer response to substitute programming, such as substitute commercials. In addition, such systems may only monitor television activity on a periodic basis, that is, time dependent sampling, rather than on a real time basis, that is, continuous monitoring.

U.S. Pat. No. 3,639,686 discloses an over-the-air marketing research system in which a substitute television signal is broadcast throughout a broadcast area over a VHF or UHF channel not being utilized by television broadcast stations operating in the area. In one embodiment, a control signal is broadcast that identifies a preselected class (occupation) of viewers to be reached by the substitute television signal. Those households having television receivers equipped to receive the substitute television signal and also having a household identification corresponding to the preselected class of viewers are capable of receiving the substitute television signal if the television receivers in the households are tuned to the designated channel. This system is limited in that the households in each class of viewers are fixed upon the installation of receiving equipment in each household and cannot thereafter be altered or subdivided without the installation of new equipment. In addition, conventional transmitters broadcasting the substitute television signal over a standard VHF or UHF channel with normal signal strength would result in an inordinately expensive system.

With the development of cable television networks, marketing research has been performed through systems that are capable of delivering alternate programming material to cooperating households via coaxial cables. An early proposed system is disclosed in U.S. Pat. No. 3,366,731 and constitutes a split cable system having two coaxial cables emanating from a single transmission source that service either different portions of the same test area or alternate households in a test area. Again while substitute programming can be transmitted over one or the other of the cables, this system lacks flexibility in that it is the initial connection of a particular distribution cable to a particular household that determines the test group. The groups may not be changed unless the connection of the distribution cable to a particular household is changed. In addition, this system does not enable the subdivision for marketing research purposes of households connected to a particular distribution cable.

U.S. Pat. Nos. 4,331,973 and 4,331,974 disclose a cable television network for accomplishing marketing research that is capable of providing substitute television signals, for example, substitute commercials, over one or more unused cable channels. The disclosed system switches substitute programming for the regularly scheduled or standard programming in cooperating households by a command over the cable network. The system also is capable of recording at the transmitting end the channel being watched by the cooperating households. Such recorded data subsequently may be correlated with the purchasing habits of members of the cooperating households.

While such a system constitutes an improvement over many other conventional marketing research methods, the system is limited by the fact that it utilizes a cable network for performing the marketing research and by its inability to preprogram an entire substitute programming schedule for an entire broadcasting day and by its lack of local or household storage for recording at each cooperating household the activity of that household's television receiver during an entire broadcasting day. In addition, since the majority of the households in the United States having television receivers are not serviced by cable, truly demographic marketing research test results are not practically obtainable. For example, only the relatively affluent in a particular test area served by cable television can afford the monthly cable television subscription fee. Thus, only the relatively affluent could participate in such a marketing research system utilizing cable television. A need therefore exists for a marketing research system capable of fairly and accurately measuring the responses of consumers to new products, ideas and television program content without regard to the consumer's economic status or the electronic progress in a particular community.

SUMMARY OF THE INVENTION

An object of the present invention is to provide a new and improved marketing research system and method.

Another object of the present invention is to provide a new and improved method and system for conducting marketing research in cooperating households having television receivers.

Another object of the present invention is to provide a new and improved method and system for conducting marketing research through television programming directed at cooperating households in which substitute television programming can be transmitted over-the-air and controllably switched into television sets in any preselected cooperating households.

Briefly, the present invention constitutes a new and improved, preprogrammed over-the-air marketing research system for conducting marketing research tests in a given test area through cooperating households having television receivers. Those households in a given test area that have agreed to participate in the marketing research tests are equipped with special receiving apparatus that enables the households to receive and view substitute television programming. The system utilizes a local or test area command and control computer; a conventional, normal television signal transmitter for transmitting regularly scheduled television signals over-the-air to non-cable households or a cable distribution network for providing cable households with regularly scheduled television signals; and a lower power, high frequency ground based microwave transmitter or, alternatively, a transponder mounted in an earth-orbiting satellite for broadcasting a special television signal over-the-air (as opposed to delivery by a cable network). The special television signal includes substitute television programming, for example, a substitute test commercial, and substitute programming control signals and other information transmitted in the form of digital data. The system also may utilize automatic purchasing response apparatus placed in cooperating retail stores in the test area for automatically recording the purchases of the cooperating households and for relaying that information to the local or test area command and control computer for subsequent evaluation by market researchers.

Each cooperating household is equipped with household signal receiving apparatus that includes an antenna and a combined tuner/converter for delivering a normal over-the-air television signal to a non-cable household or a cable television signal distribution cable and a tuner/converter for delivering a normal cable television signal to a cable household. Each cooperating household is additionally equipped with a high frequency, high gain microwave antenna for receiving the special television signal, a down converter for converting that special television signal to an unused channel and a household television control unit. The control unit includes a decoder for separating the audio and video program information portions of the substitute programming signal from the substitute programming control signals and associated digital data. The audio and video program information portions are directed to a three-way radio frequency switch; and the substitute programming control signals as well as the associated data are directed at high speed, for example, 9600 baud, to a household control computer.

The household computer receives and stores a substitute programming schedule from the test area command and control computer for an entire broadcast day or a longer or shorter period of time, including, if desired, the approximate time of each substitute programming event. The household computer is also responsible for continuously monitoring and recording the "on-off" condition of the television receiver and the identification of the channel being watched. In addition, the household computer controls the condition of the three-way switch, thereby enabling the viewing members of a particular cooperating household to view the normal television signal or the substitute programming or text and/or music either previously stored in the household computer memory unit or decoded from the digital data portion of the special television signal and displayed in real time. In this manner, a new and improved, highly flexible, over-the-air television marketing research system is provided that is capable of effectively and efficiently measuring the responses of consumers in a test area to new products, ideas and television program content without regard to the consumers' economic status or the electronic progress in the test area.

BRIEF DESCRIPTION OF THE DRAWING

The above and other objects and advantages and novel features of the present invention will become apparent from the following detailed description of the preferred embodiment of the present invention illustrated in the accompanying drawing wherein:

FIG. 2 is a schematic diagram of a local area command and control computer for use in conjunction with the system of FIG. 1;

FIG. 3 is a schematic diagram of television signal receiving apparatus at each cooperating household for use in the system of FIG. 1;

FIG. 4 is a more detailed schematic diagram of the television signal receiving apparatus of FIG. 3; and FIG. 5 is a schematic diagram of an automatic household purchasing response apparatus for use with the system of FIG. 1.

DESCRIPTION OF THE PREFERRED EMBODIMENT

Figure 1:
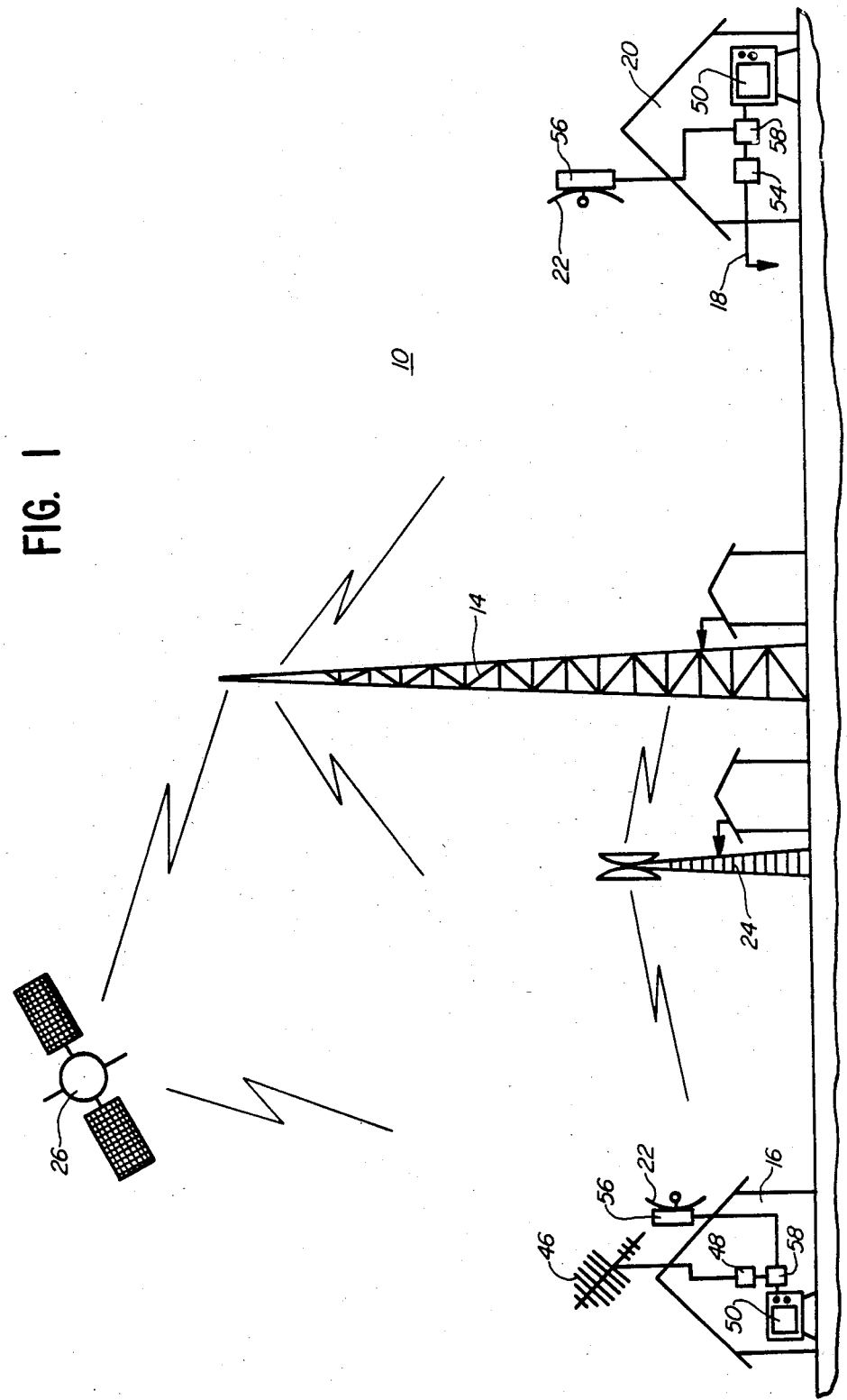
FIG. 1 is a schematic illustration of a preprogrammed over-the-air marketing research system constructed in accordance with the principles of the present invention.

Referring initially to FIG. 1 of the drawing, there is illustrated a new and improved preprogrammed over-the-air marketing research method and system 10 constructed in accordance with the principles of the present invention. The system 10 is used in any given test area where individual households have been screened to build a test group that, demographically, is representative of the general population. Once chosen, those households that agree to participate are equipped with special receiving apparatus that enables the households to receive and view substitute television programming. The system 10 utilizes a local or test area command and control computer 12 (FIG. 2) and a conventional, high power, normal television signal transmitter 14 for transmitting a normal or regularly scheduled television signal to regular over-the-air or noncable households 16. The system 10 may also be used in conjunction with a cable distribution network 18 that provides cable households 20 with standard television signals over a coaxial cable. Both of the households 16 and 20 are representative of a large number of preselected cooperating households in a particular test area, each of which has been equipped with a high frequency, high gain microwave antenna 22 for receiving a special over-the-air television signal. The special television signal includes both substitute programming and substitute programming control signals. The special television signal may be broadcast by a low power, high frequency microwave transmitter 24 or, alternately, by one of the transponders in an earth orbiting satellite 26. Signal receiving apparatus 28 (FIGS. 3 and 4) placed in each cooperating household 16 and 20 control the receipt and utilization of the normal television signal from the transmission tower 14 and the special television signal from the microwave transmitter 24 or the satellite 26. The system 10 may also utilize automatic household purchasing response apparatus 30 (FIG. 5) placed in each cooperating retail store in a test area for automatically recording the purchases of each cooperating household 16,20 in the test area. Such information may subsequently be used by market researchers in evaluating the effectiveness of the normal and substitute television programming.

SPECIAL TELEVISION SIGNAL TRANSMISSION

In the preferred embodiment of the present invention, the low power microwave transmitter 24 is used to transmit, preferably, continuously, a special television signal having a signal bandwidth of approximately six megahertz in the frequency range of from approximately 2.500 to approximately 2.686 gigahertz. This radio frequency (RF) range has been divided in the United States of America by the Federal Communications Commission (FCC) into thirtyone, six megahertz bandwidth channels, known as Instructional Television Fixed Service (ITFS). Preferably, the special television signal, which includes both substitute programming signals and digital data in the form of substitute programming control signals and associated data, is broadcast on one of the channels in the uppermost portion of the ITFS range. Specifically, one of the three, nonadjacent channels in the H group, collectively referred to as Operational Fixed Service (OFS) and allocated by the FCC on a single channel basis, is used for transmitting the special television signal. If in a particular test area the OFS range is unavailable, then it is preferred to broadcast the special television signal over one of the four nonadjacent channels in the G group of the ITFS range. In any event, by broadcasting the special television signal in the ITFS range, only a very low amount of broadcast power (under 100 watts) is required.

Alternatively, one of the transponders in the satellite 26 may be used to transmit, preferably, continuously, the special television signal. Preferably, the special television signal so transmitted would have a bandwidth of approximately six megahertz and be transmitted in the 10.90 to 36.00 gigahertz (K band) frequency range. Advantageously, the satellite 26 would be used to transmit the special television signal in the frequency range of from 15.35 to 17.25 gigahertz ($K_u$ band). By transmitting in that frequency range, only a relatively small antenna 22, for example, one less than three feet in diameter, would be required to receive the special television signal. The advantage of using the broadcast satellite 26 is that the special television signal may be received over a much greater area than that capable of being serviced by the microwave transmitter 24. For example, an entire country may be used as a test area by transmitting the special television signal from the satellite 26.

LOCAL AREA COMMAND AND CONTROL COMPUTER

The local or test area command and control computer 12 (FIG. 2) is but one of a number of remotely located computers 12, each one of which is responsible for controlling the marketing research system 10 in a particular test area, including controlling the transmission of the special television signal by the transmitter 24 or the satellite 26. In general, each local computer 12 includes a local area central processing unit (CPU) 32, a local area memory unit 34, preferably consisting of both a random access memory (RAM) and a read only memory (ROM), and a local area input/output interface (I/O) 36. Electrically connected to the interface 36 are the transmitter 24 or the satellite 26, a local area operator control terminal 38 which provides on-site operator control of the local computer 12, one or more auxiliary memory units 40 and a conventional modem/automatic dialer 42 interconnected with one or more telephones 44 or telephone access lines for communicating both with the signal receiving apparatus 28 at each cooperating household 16,20 and with a central or mainframe system computer (not illustrated).

HOUSEHOLD SIGNAL RECEIVING APPARATUS

The household signal receiving apparatus 28 (FIG. 3) installed in a regular or non-cable household 16 includes a normal over-the-air television signal antenna 46 and a conventional, combined tuner/converter 48 that may be tuned by any member of the household 16 to a desired channel to be viewed and that converts the selected channel signal to an unused channel signal, normally channel 3 or 4, for viewing on a television receiver 50. The built-in tuner of the television receiver 50 is fixedly tuned to the selected unused channel (channel 3/4).

The household signal receiving apparatus 28 associated with each cable household 20 includes a normal television signal cable 52 for delivering a normal multi-channel television signal to a conventional, normal cable television signal tuner/converter 54. An individual in the household 20 may select any one of a plurality of television channels delivered to the household 20 by the cable 52 by inputting the desired channel into the tuner/converter 54. The tuner/converter 54 converts the selected channel to an unused channel (channel 3/4) for subsequent viewing on the television receiver 50. It should be apparent that a regular or non-cable household 16 would normally not be equipped with the cable 52 or the tuner/converter 54; and, similarly, a cable household 20 would normally not be equipped with the antenna 46 or the tuner/converter 48.

Each cooperating household 16,20 in a test area is equipped with the microwave antenna 22 for receiving the special television signal and with a down converter 56 that converts the special television signal to the preselected unused channel (channel 3/4) for delivery directly to a household television control unit 58. The control unit 58 includes a decoder 60 for separating the audio and video program information portions of the substitute programming signal from the digital data that includes the substitute programming control signals and associated data (for example, the current time and the telephone number of the local computer 12 and/or test marketing questions or marketing information or public service messages or other text and/or music). The audio and video program information portions are directed to a three way (A-B-C), radio frequency switch 62; and the substitute programming control signals and associated data are directed to a small household control computer 64. For illustrative purposes only a lead is shown (FIG. 3) connecting the tuner/converter 48 to the switch 62 and a lead is shown connecting the tuner/converter 54 to the switch 62. It should be understood that in a particular household 16,20 only one such lead would be directed to the switch 62.

The household television control unit 58 and the househuld computer 64 are shown in greater detail in FIG. 4. The computer 64 includes a central processing unit (CPU) 66; an integral internal clock 68; a memory unit 70 (preferably formed by both a random access memory and a read only memory); an expansion bus 72; a video and sound output unit 74 that is capable of delivering text and/or music on the unused channel (channel 3/4) to the switch 62; and an input/output interface 76. The CPU 66, the clock 68 and the memory unit 70 may be physically embodied on the same microprocessor chip, for example, a Zilog Model "Z-80" microprocessor chip.

While it could be transmitted as part of the over-the-air special television signal, normally the computer 64 receives telephonic instructions in advance from the local computer 12 and stores these telephonic instructions that normally include a substitute programming schedule for a substantial portion or all of an entire broadcast day or for a longer period of time, including the approximate time of each substitute programming event. This information is provided to the computer 64 by means of a telephone 78 and an associated modem-/automatic dialer 80 located in each household 16,20. The computer 64 is also responsible for monitoring and recording, on a real time basis, (as opposed to sampling at relatively widely spaced time internals) the "on-off" condition of the television receiver 50, which information is provided by a conventional television receiver "on" sensor 82. In addition, the computer 64 monitors and records the identification of the channel being watched and controls the condition of the three-way switch 64, thereby enabling the viewing members of the households 16,20 to view the normal television signal from the tuner/converter 48 (or 54) or the substitute programming from the down converter 56 and the decoder 60 or text and/or music from the video and sound output unit 74.

Finally, each household television control unit may also include one or more auxiliary devices 86, 88 and 90 for use in conjunction with the computer 64, as described in more detail hereinafter. Power to run the control unit 58 is supplied by each household 16,20 as represented by the plug 84.

HOUSEHOLD PURCHASING RESPONSE REPORTING

The response of cooperating household 16,20 to marketing research tests performed by means of the system 10 may be determined in any one of a number of ways. For example, each cooperating household 16,20 may be supplied with a diary in which each household member records purchases and, preferably, the date, place and cost of the purchases. Such entries are manually made and the diaries may then be later mailed to a central collection point for proper formating and evaluation as part of a particular test. Alternatively, an auxiliary device 86 (FIG. 4) in the form of a Universal Product Code (UPC) scanner may be provided to each cooperating household 16,20. By using such a UPC scanner 86, a member of the household can optically scan the UPC code commonly imprinted on retail items for entry in digital form into the household computer 64. After proper formatting, the purchasing information subsequently can be transmitted to the local computer 12. Preferably, each UPC scanner 86 supplied to the households 16,20 includes either a numerical or an alphanumerical manual entry terminal to permit the entry of retail purchases that lack UPC identification.

As a further alternative, the auxiliary device 88 may comprise a standard computer keyboard for entering numeric or alphanumeric representations of retail purchases into the computer 64. Advantageously, such a keyboard 88 could also be used to enter into the computer 64 answers to marketing test questions received from the local computer 12 and displayed on the television receiver 50 and directed at one or more members of the household 16,20. The answers would subsequently be transmitted to the local computer 12 for evaluation by market researchers. The keyboard 88 would also be useful when used in conjunction with the auxiliary device 90 in the form of a small auxiliary computer 90 used for playing television games on the television receiver 50. Specifically, questions preprogrammed in a television game cartridge or received from the local computer 12 and displayed on the television receiver 50 in conjunction with the television game being played could be answered on the keyboard 88 and the answers stored, formatted and subsequently transmitted by the computer 64 to the local computer 12 for subsequent analysis by market researchers.

As a further alternative, the retail purchasing responses of the members of the households 16,20 to marketing tests conducted through the system 10 may be automatically recorded by the automatic household purchasing response apparatus 30 (FIG. 5). Specifically, each cooperating retail store in a test area would utilize equipment corresponding to the apparatus 30 to record the retail purchases of members of the households 16,20. Whenever a member of the household 16,20 makes a retail purchase, that purchase would be automatically recorded at the check-out counter of the cooperating retail store. Specifically, one of a plurality of Universal Product Code (UPC) scanners 92 would be used by a clerk in the retail store to scan and record each purchase made by a member of the household 16,20 in a conventional manner. In addition, the clerk would request or the purchaser would volunteer an identification card containing an optically or magnetically readable code identifying the purchaser in order to associate the purchases with a particular household 16,20. Alternatively, the checker may enter a numeric or alphanumeric identification code for the purchaser into the UPC scanner terminal, thereby providing the required identification.

A store computer 94, which typically includes a central processing unit (CPU) 96 and a memory unit 98 and input/output apparatus 100, receives the purchasing information from the UPC scanner 92, formats and stores the information and, subsequently, in response to an inquiry from the local computer 12, transmits the purchasing information by means of a combined modem and automatic dialer 102 and a telephone or telephone line 104 to the computer 12 for subsequent analysis by market researchers. The information transmitted typically would include at least an identification of the household 16,20, an identification of the purchases made by that household 16,20, and the identification of the store transmitting the data. The data may also include the price of each product purchased, the date of the purchase and the time of the purchase. Each store typically is also provided with a terminal 104 for maintaining control of the store computer 94.

MARKETING RESEARCH SYSTEM OPERATION

In any given test area, for example, a city capable of being serviced by the microwave transmitter 24 or an entire country capable of being serviced by the satellite 26, households that agree to be test panelists, of which the households 16,20 are representative, have their control units 58 placed under the control of the local test area command and control computer 12. The computer 12 and the household computers 64 of the household television control units 58 communicate over telephone lines, preferably, the home telephones 78 of the households 16,20. The computers 64 initiate telephonic communication with the computer 12 through the modem-/automatic dialers 80 and transmit data at a standard rate of approximately 300 baud.

The computer 12 receives a substitute programming cut-in master schedule for use in individually programming the household television control units 58 of the households 16,20 from the central computer via the telephone 44 or programmed magnetic tapes. The computer 12 establishes a marketing test matrix that identifies which ones of the cooperating households 16,20 will be members of various test panels for substitute programming test events scheduled to occur during the next broadcast period, for example, a twenty-four to seventy-two hour period. As is apparent, each cooperating household 16,20 can be placed in a specific test panel scheduled to participate in a test event or omitted therefrom for every programming minute of the day. After each computer 64 transmits its stored data to the computer 12, the computer 12 transmits an individually organized substitute programming schedule to the computer 64 which may include the approximate timing of the scheduled test events. Alternatively, this information may be transmitted individually to each household computer 64 in the digital data portion of the special television signal. Basically, this information establishes a truth table in the memory unit 70 of the computer 64 which, when satisfied and upon the receipt of a synchronization signal, results in the computer 64 changing the switched state of the A-B-C switch 62, and thus the signal delivered to the television receiver 50, from Channel A, the normal television signal, to either Channel B, the special television signal containing substitute programming, or to Channel C, the preprogrammed text and/or music from the memory unit 70 and the video and sound output unit 74 or real time text and/or music then being transmitted in the digital data portion of the special television signal and delivered to the switch 62 through the decoder 60 and the video and sound output unit 74. When the test event has been completed, the computer 64, assuming no other test event has been programmed to immediately follow, changes the switched state of the switch 62 to Channel A to resume the delivery of the normal television signal of the television receiver 50. If, however, the television receiver 50 had not been tuned to the channel for which the substitution was to occur, the switch 62 would not have been activated by the computer 64; and the substitution would not have occurred.

The computer 12 also controls the special television signal broadcast by the microwave transmitter 24 or by the satellite 26. More specifically, the computer 12 indicates to an on-site operator exactly when to initiate a broadcast of the special television signal and also synchronizes the substitute programming, for example, a substitute test commercial, with the regular television signal.

After each broadcast period (twenty-four hours or longer), each household computer 64 is preprogrammed to call its local computer 12 via the telephone 78 and the modem/automatic dialer 80 to transmit the data stored and properly formatted by the computer 64. Basically, the data transmitted includes a complete real time log of the activity of the television receiver 50 and also marketing research test data inputted into the computer 64 through one or more of the auxiliary devices 86, 88 and 90. The household computers 64 are preprogrammed to call the computer 12 in staggered groups during a time window assigned to each computer 64 during its initial power-up call to the computer 12. If more computers 64 attempt simultaneously to contact the computer 12 than the maximum telephone line allocation of the computer 12, those computers 64 receiving a busy signal are programmed to redial the computer 12 after a random time delay. After the time window for all computers 64 in a local test area to report has passed, the data collected by the computer 12 is sorted, properly formatted and prepared for transmission to the central or main frame computer. Such data would include an identification of apparently malfunctioning household computers 64 including those that did not report during the reporting time window. In the unlikely event that a particular memory unit 70 of a computer 64 becomes filled to capacity, the computer 64 assumes an idle state until it empties its stored data during the time window assigned for reporting to the computer 12.

The special television signal broadcast over-the-air by the microwave transmitter 24 or the satellite 26 includes an audio subcarrier which serves as a digital data channel to transmit information and/or instructions to the household television control units 58. For example, as discussed above, the time of day and the telephone number of the computer 12 are continuously broadcast over this data channel to enable a computer 64 after a power failure to immediately contact the computer 12 to obtain instructions including a substitute programming schedule. In addition, when substitute programming is to be aired, it normally would be proceeded both by an identifying label transmitted over this data channel and a substitution synchronization data bit.

In at least the following three instances, the computer 64 is programmed to contact the local computer 12. The first instance involves a daily or other periodic check-in and data reporting call that takes place within the preassigned reporting time window. This call will always occur, whether or not there is data to be transmitted by a computer 64. During this call, each computer 64 receives from the computer 12 an individually constructed substitute programming schedule and other information for the next broadcast period. In addition, every time there is a power failure and upon the restoration of power, the affected computer 64 performs a self-diagnostic routine. Subsequently, upon receipt of the time of day and the telephone number of the local computer 12 that are continually broadcast as part of the special television signal, the computer 64 calls the computer 12, informs the computer 12 of its status and receives a substitute programming schedule and other instructions from the computer 12. Thirdly, upon initial installation, a newly installed computer 64 performs the self-diagnostic routine referred to above. Upon receipt of the time of day and telephone number of the local computer 12, the computer 64 calls the computer 12 to receive a substitute programming schedule and other instructions.

When a serviceman installs the household television control unit 58 in the household 16,20, he normally will call the site of the local computer 12 and inform the site operator of the identification number of the household 16,20 and of the unique serial number of the control unit 58 being installed. The operator will then enter the serial number of the control unit 58 into the database of the computer 12 at which time it will be uniquely associated with the identification number of the household 16,20 in which it has been installed. The serviceman should then place the control unit 58 in an operative condition, at which time the computer 64 performs the above-mentioned power-up routine.

The following is illustrative of one of many different formats that may be used in transmitting information between each computer 64 and the local computer 12. Basically, when calling the computer 12, each computer 64 transmits at least three types of messages: a prologue and status message, substitute programming cut-in information messages and channel change messages. The prologue and status message normally proceeds all data tansmissions by a computer 64 to the computer 12 and is a multibyte message containing the following information. The initial two bytes contain the unique serial number of the household television control unit 58 making the call to the computer 12. The following four bytes represent the number of seconds from a fixed time reference, such as midnight of the first day of the year, since the control unit 58 was last energized. This information may be used to check the integrity of the transmitted data. The next four byes of data indicate the number of seconds since the time of the last call of the control unit 58 to the computer 12. This data is used as a reference for the time set forth in the channel change and substitute programming cut-in messages. The following four bytes of data set forth the current date and time in seconds to ensure that the clock 68 is accurate. The next four bytes of data represent the purpose of the call being made and the status of the control unit 58. Specifically, the first byte represents the purpose of the call being made, the second byte indicates whether a non-cable household 16 or a cable household 20 is reporting and the remaining two bytes are used to indicate error conditions within the computer 64. The next four bytes of information indicate the number of substitute programming cut-in message packets (a data stream transmitted over the telephone line as a unit) and the number of channel change message packets to be transmitted during the telephone call.

By grouping the data to be transmitted over the telephone line from the computer 64 to the computer 12 into individual message packets, data transmission reliability is improved. Each packet groups data records into a uniquely identifiable entity that may be easily handled and verified by the computer 12. The computer 12 can identify transmission errors as they occur and request the computer 64 transmitting the information to retransmit improperly transmitted message packets. Each message packet includes three parts: a header, the data records and an error checking word. The header may be five bytes of data, the first byte identifying the length of the header and the data, excluding the error checking word, another byte identifying the type of data records that are being transmitted and another two bytes identifying the particular number of the message packet then being transmitted. When all of the message packets of a particular type have been sent, a byte is used to indicate "end of data". The packet number is identified so that interrupted telephone communications can be resumed where they left off.

Following the header, the data records are transmitted. Typically, the prologue and status message will have only one record per message packet. The substitute programming cut-in data typically will have twenty records per message packet; and the channel change information typically will have thirty records per message packet. Following the transmission of the data records, a two byte error checking word is transmitted.

A suitable format for transmitting each substitute programming cut-in data record is a multibyte data stream in which the initial two bytes identify the substitute programming transmitted to the television receiver 50, the following byte identifies the channel to wnich the television receiver 50 was tuned at the time the substitute programming cut-in was made and the following three bytes relate the number of seconds since the time specified in the prologue and status message described above.

A suitable format for transmitting each channel change data record is a multibyte data stream in which the initial byte indicates the channel to which the television receiver 50 has been changed and the following three bytes relate the number of seconds since the time specified in the prologue and status message. Preferably, the computer 64 is programmed to inhibit the recordation of channel change information unless the television receiver 50 is tuned to a particular channel for a predetermined number of seconds before a channel change occurs, except in the instance where a substitute programming cut-in occurs prior to the expiration of the predetermined number of seconds. When the television receiver 50 is initially turned on, the event is recorded as a change to the channel to which the television receiver 50 is tuned. When the television receiver 50 is turned off, that event is recorded as a change to channel zero.

A set of rules or protocol is used to transmit data between each computer 64 and the local computer 12. The protocol directs data flow in an orderly manner and provides for error checking. When the preassigned time arrives for a computer 64 of a control unit 58 in a particular household 16,20 to call the local computer 12, the computer 64 enables the modem/automatic dialer 80 to dial the telephone number of the computer 12. If an access line to the computer 12 is available, the computer 64 transmits properly formatted data records grouped into separate message packets. When the computer 64 has transmitted all of its message packets, it then receives a substitute programming schedule and other information from the computer 12 for storage and use during the following broadcast period. The substitute programming schedule and any other information from the computer 12 are transmitted via message packets. After all of the message packets have been received by the computer 64, the telephone connection is broken.

When the computer 64 of the control unit 58 calls the computer 12, it thereby establishes the control unit 58 as the message sender and the computer 12 as the receiver using a "handshake" protocol. The handshake is one byte of data transmitted back and forth which indicates the mode of data transmission. After the first handshake byte is transmitted, the computer 64 transmits a message packet to the computer 12. At the completion of the transmission of that message packet, the computer 12 transmits a byte indicating the message packet as received was correct or incorrect. The computer 12 may reverse the protocol by requesting to send data, for example, substitute programming information, to the computer 64.

The telephone connection between each computer 64 and its associated local computer 12 is designed to be transparent to the household 16,20. Thus, if a member of the household 16,20 initiates usage of the telephone 78 during the transmission of data over the telephone 78, the connection between the computer 64 and the computer 12 is automatically broken and may be restored at a later time when the telephone 78 is not being used by a member of the household 16,20. Upon restoration of the telephone connection between the computer 64 and the computer 12, the transmission of data is resumed with the interrupted message packet.

Upon a power interruption to the computer 64, the information stored in the memory unit 70 may be lost. After power is restored, the computer 64 performs the power-up sequence discussed above. If a large power outage has occured, the phone network servicing the computer 12 may be overloaded by a large number of computers 64 attempting to establish contact with the computer 12. To avoid this, each computer 64 is preprogrammed to delay calling the computer 12 by a random time delay. In addition, if busy signal is received, the computer 64 will make another attempt to call the computer 12 after the programmed random time delay. A telephone line failure which would prevent a computer 64 from contacting the computer 12 shows up as a malfunction in the records of the computer 12 which should expedite the repair of the telephone line. Similarly, if a household television control unit 58 or its computer 64 is damaged, disconnected or removed from a household 16,20, such an event also is indicated as a malfunction in the records generated by the computer 12. If the computer 12 malfunctions, each household television control unit 58 is notified by the data portion of the special television signal broadcast by the microwave transmitter 24 or the satellite 26. The computers 64 of the household television control units 58 can be instructed to take appropriate action to prevent overloading their memory units 70.

Obviusly, many modifications and variations of the present invention are possible in light of the above teachings. For example, the computer 64 can be programmed to monitor and store on a real time basis the "on-off" condition of a standard mute switch typically associated with the tuner/converters 48,54. This information would be transmitted to the local computer 12 during the preassigned reporting time window using essentially the same format as the channel change messages. This information may then be correlated with the substitute programming cut-in report to enable marketing researchers to determine whether the substitute programming, normally substitute commercials, was both being viewed and listened to by the veiwing members of the household 16,20. Such information would improve the accuracy and acceptance of the marketing research test results obtained by means of the system 10. Thus, it should be understood that, within the scope of the appended claims, the invention may be practiced otherwise than as specifically described hereinabove.

What is claimed and desired to be secured by Letters Patent is:

1. A marketing research system comprising
   a plurality of cooperating households in a test area,
   each of said households including a television receiver and normal television signal receiving means for delivering normal television signals including regularly scheduled programming to each household,
   special television signal transmission means for providing a special television signal including substitute programming to said households, said special television signal transmission means comprising a satellite, and
   means for controlling said television receiver in each of said households to display either said regularly scheduled programming or said substitute programming, at least one of said households having a special television signal receiving means for receiving said special television signal over-the-air from said satellite.

2. A marketing research system as recited in claim 1 wherein said controlling means comprises a household computer in each of said households and switch means controlled by said household computer for automatically directing, in a first switch condition, said regularly scheduled programming to said television receiver or for automatically directing, in a second switch condition, said substitute programming to said television receiver.

3. A marketing research system as recited in claim 1 wherein each of said households further includes a special television signal receiving means for receiving said special television signal over-the-air from said satellite.

4. A marketing research system as recited in claim 1 wherein said test area comprises an entire country.

5. A marketing research system as recited in claim 1 wherein said special television signal is transmitted from said satellite at a signal frequency in the range of from 10.90 through 36.00 gigahertz.

6. A marketing research system as recited in claim 5 wherein said signal frequency is in the range of from 15.35 through 17.25 gigahertz.

7. A marketing research system comprising
   first computer means for controlling the operation of said system in a test area, said first computer means containing the identifications of individual cooperating households in said test area and a schedule of substitution events that are to occur during a broadcast period,
   each of said households including a television receiver and a normal television signal receiving means for delivering normal television signals including regularly scheduled programming to each household,
   special television signal transmission means for delivering a special television signal including substitute programming to said households, said special television signal transmission means comprising a satellite that transmits said special television signal over-the-air,
   each of said households having both special television signal receiving means for receiving said special television signal and a second computer means capable of being periodically interconnected with said first computer means for receiving and storing an individually organized schedule of substitution events for controlling the display on said television receiver in said household of either said regularly scheduled programming or said substitute programming, a substitution event constituting the display of said substitute programming on said television receiver in place of said regularly scheduled programming, at least one of said households having a special television signal receiving means for receiving said special television signal over-the-air from said satellite.

8. A marketing research system as recited in claim 7 further comprising response monitoring means for determining the response of at least one of said households to said substitute programming.

9. A marketing research system as recited in claim 8 wherein said response monitoring means comprises means disposed in at least one of said households for recording the retail purchases made by one or more members of said household.

10. A method of performing marketing research in a test area comprising the steps of
- selecting a plurality of cooperating households having television receivers in the test area for participation in said marketing research, each cooperating household having means for receiving normal television signals including regularly scheduled programming available in said test area,
- transmitting a special television signal including substitute programming from a satellite over-the-air to said plurality of cooperating households,
- equipping each of said plurality of cooperating households with an antenna for receiving said special television signal over-the-air from said satellite,
- monitoring, time stamping and storing with first computer means in each cooperating household any changes both in the on-off condition of the television receiver in said cooperating household and in the channel to which said television receiver is selectively tuned by a member of said cooperating household,
- utilizing second computer means remotely located from each cooperating household to individually program each first computer means in each cooperating household in advance with instructions for a broadcast period for controlling the display of either said regularly scheduled programming or said substitute programming on said television receiver in said cooperating household and
- monitoring with said first computer means when substitute programming is displayed on the television receiver in each cooperating household and storing such monitored information in said first computer means for subsequent transmittal to said second computer.

11. A method of performing marketing research as recited in claim 10 wherein said test area comprises an entire country.

12. A method of performing marketing research as recited in claim 10 wherein said transmitting step comprises the step of transmitting said special television signal over-the-air from said satellite at a signal frequency in the range of from 10.90 through 36.00 gigahertz.

13. A method of performing marketing research in a test area comprisng the steps of
- selecting a plurality of cooperating households having television receivers in the test area for participation in said marketing research, each cooperating household having means for receiving normal television signals including regularly scheduled programming available in said test area,
- transmitting a special television signal including substitute programming over-the-air from a satellite in order to deliver said special television signal to each cooperating household in the test area,
- equipping each cooperating household with means for receiving said special television signal, at least one of said cooperating households being equipped with means for receiving said special television signal over-the-air from said satellite, and
- automatically enabling the display of either said regularly scheduled programming or said substitute programming on the television receiver in each cooperating household.

14. A method of performing marketing research as recited in claim 13 wherein said transmitting step comprises the step of transmitting said special television signal from said satellite at a signal frequency in the range of from 10.90 through 36.00 gigahertz.

15. A system for performing marketing research in a test area comprising
- normal television signal receiving means for delivering normal television signals including regularly scheduled programming to each of a plurality of cooperating households in said test area, each of said households having a television receiver,
- special television signal transmission means for delivering to each of said households a special television signal that may include substitute programming, said special television signal transmission means including a satellite,
- at least one of said households including means for receiving said special television signal over-the-air from said satellite,
- first computer means in each of said households both for controlling the television receiver in said household to display either said regularly scheduled programming or said substitute programming and for monitoring the programming actually displayed by said television receiver,
- second computer means remotely disposed from said households for addressing each of said first computer means in each of said households to enable the display of either said regularly scheduled programming or said substitute programming on said television receiver in each of said households.

16. A method of performing marketing research in a test area comprising the steps of
- selecting a plurality of cooperating households having television receivers in the test area for participation in said marketing research, each cooperating household having means for receiving normal television signals including regularly scheduled programming available in said test area,
- transmitting a special television signal including substitute programming from a satellite in order to deliver said special television signal to each cooperating household in the test area, each cooperating household having means for receiving said special television signal, at least one of said households having means for receiving said special television signal over-the-air from said satellite,
- automatically selectively enabling the display of either said regularly scheduled programming or said substitute programming on a television receiver in each cooperating household,
- equipping each cooperating household with first computer means capable of monitoring and storing information indicative of the programming actually displayed on the television receiver in said cooperating household and
- transmitting such monitored information from said first computer means in each cooperating household to a second computer means for processing said monitored information.

17. A method of performing marketing research comprising the steps of
- selecting a plurality of cooperating households having television receivers for participation in said marketing research, each cooperating household having means for receiving regularly scheduled programming, transmitting a television signal from a satellite in order to make substitute programming available to each cooperating household, each cooperating household having means for receiving said substitute programming, at least one of said households having means for receiving said television signal over-the-air from said satellite, automatically selectively enabling the display of either said regularly scheduled programming or said substitute programming on a television receiver in each cooperating household and automatically monitoring and storing information indicative of the programming actually displayed on said television receiver in each cooperating household.

18. A method of performing marketing research as recited in claim 17 wherein said selecting step comprises the step of selecting a plurality of cooperating households in a test area for participation in said marketing research, said test area being an entire country.

19. A method of performing marketing research as recited in claim 17 wherein said transmitting step comprises the step of transmitting said television signal at a signal frequency in the range of from 10.90 through 36.00 gigahertz.

20. A method of performing marketing research as recited in claim 19 wherein said transmitting step comprises the step of transmitting said television signal at a signal frequency in the range of from 15.35 through 17.25 gigahertz.

21. A marketing research system comprising
a plurality of cooperating households in a test area,
each of said households including a television receiver and normal television signal receiving means for delivering normal television signals including regularly scheduled programming to each household,
special television signal transmission means for delivering a special television signal including substitute programming over-the-air to said households, said special television signal transmission means comprising a low power microwave transmitter that transmits said special television signal in the frequency range of from approximately 2.500 to approximately 2.686 gigahertz, at least one of said households having a special television signal receiving means for receiving said special television signal over-the-air said low power microwave transmitter, and
control means for automatically controlling said television receiver in each of said households to enable the display of either said regularly scheduled programming or said substitute programming.

22. A marketing research system as recited in claim 21 wherein each of said households further includes a special television signal receiving means for receiving said special television signal over-the-air from said low power microwave transmitter, said special television signal receiving means comprising a high frequency, high gain microwave antenna.

23. A system for performing marketing research in a test area comprising
normal television signal receiving means for delivering normal television signals including regularly scheduled programming to each of a plurality of cooperating households in said test area, each of said households having a television receiver,
a low power microwave transmitter for transmitting a special television signal that may include substitute programming over-the-air to make said special television signal available to each of said households, the broadcast power of said low power microwave transmitter being under 100 watts,
at least one of said households having means for receiving said special television signal over-the-air from said low power microwave transmitter,
means for automatically enabling the television receiver in each of said households to display either said regularly scheduled programming or said substitute programming and
means for automatically monitoring and for storing data indicative of the programming actually displayed on said television receiver in each said households.

24. A system for performing marketing research as recited in claim 23 wherein said special television signal comprises a signal transmitted by said low power microwave transmitter at a signal frequency in the range of from 2.500 through 2.686 gigahertz.

25. A system as recited in claim 23 further comprising control means remotely disposed from said households for determining on an individual basis the display of either said regularly scheduled programming or said substitute programming on said television receiver in each of said households.

26. A system as recited in claim 25 wherein said special television signal includes the telephone number of said remotely disposed control means.

27. A system as recited in claim 26 wherein said special television signal is transmitted continuously over-the-air and includes digital data representative of the time of day.

28. A method of performing marketing research in a test area comprising the steps of
selecting a plurality of cooperating households having television receivers in the test area for participation in said marketing research, each cooperating household having means for receiving normal television signals including regularly scheduled programming available in said test area,
transmitting a special television signal including substitute programming via a low power microwave transmitter over-the-air at a signal frequency in the range of from 2.500 through 2.686 gigahertz to make said special television signal available to each cooperating household in the test area, each cooperating household having means for receiving said special television signal, at least one of said cooperating households having means for receiving said special television signal over-the-air from said low power microwave transmitter,
equipping each cooperating household with a household computer capable of monitoring and storing any changes both in the on-off condition of the television receiver in said cooperating household and in the channel to which said television receiver is selectively tuned by a member of said cooperating household and
monitoring with said household computer when substitute programming is displayed on the television receiver in each cooperating household and storing such monitored information for subsequent marketing analysis.

29. A method of performing marketing research as recited in claim 28 wherein said transmitting step comprises the step of transmitting said special television signal from said low power microwave transmitter at a signal frequency in the range of from 2.500 through 2.686 gigahertz with a signal bandwidth of approximately six megahertz.

30. A method of performing marketing research as recited in claim 28 further comprising the step of monitoring the response of at least one of said cooperating households to said marketing research.

31. A marketing research system comprising
a plurality of cooperating households in a test area,
each of said households including a television receiver and normal television signal receiving means for delivering normal television signals including regularly scheduled programming to each household,
special television signal transmission means for delivering a special television signal including substitute programming to said households and
control means for automatically enabling said television receiver in each of said households to display either said regularly scheduled programming or said substitute programming,
each of at least some of said households further including muting means for reducing the volume of the sound from said television receiver in said household when said muting means is placed in an "on" condition, said muting means in an "off" condition having substantially no effect upon the volume of the sound from said television receiver, and muting monitoring means for monitoring the "on" condition or the "off" condition of said muting means and
means for storing for subsequent marketing research analysis the condition of said muting means in said households monitored by said muting monitoring means.

32. A marketing research system as recited in claim 31 wherein said storing means comprises a household computer having memory means for receiving from said muting monitoring means and for storing the changes throughout a broadcast period and the times of changes in the condition of said muting means.

33. A method of performing marketing research in a test area comprising the steps of
selecting a plurality of cooperating households in the test area having television receivers and means for receiving normal television signals including regularly scheduled programming available in said test area for participation in said marketing research, at least some of said households having muting means for reducing the volume of the sound from said television receiver in said households when placed in an "on" condition, said muting means in an "off" condition having substantially no effect upon the volume of the sound from said television receiver,
transmitting a special television signal including substitute programming to each cooperating household in the test area, each cooperating household having means for receiving said special television signal,
automatically enabling the display of either said regularly scheduled programming or said substitute programming on said television receivers in said plurality of cooperating households and
automatically monitoring and storing the condition of said muting means in said some of said households for subsequent marketing research analysis.

34. A system for monitoring the television programming displayed in households comprising
a plurality of cooperating households, each cooperating household having a television receiver for displaying television programming,
each of at least some of said households having muting means for reducing the volume of the sound from said television receiver in said household when said muting means is placed in a "on" condition, said muting means in an "off" condition having substantially no effect upon the volume of sound from said television receiver, and muting monitoring means for monitoring the "on" condition or the "off" condition of said muting means and
means for storing for subsequent analysis the condition of said muting means as monitored by said muting monitoring means.

35. A system as recited in claim 34 wherein said storing means comprises a computer having memory means for receiving from said muting monitoring means and for storing the changes throughout a broadcast period and the time of changes in the condition of said muting means.

36. A marketing research system comprising
a plurality of cooperating households in a test area,
each of said households including a television receiver and normal television signal receiving means for delivering normal television signals including regularly scheduled programming to each household,
means for delivering a special television signal including substitute programming to said households,
control means in each of said households for automatically enabling said television receiver in each of said households to display either said regularly scheduled programming or said substitute programming and
means remotely disposed from said households for enabling each control means in each of said households to automatically enable the display on said television receiver in each of said households of either said regularly scheduled programming or, at one or more selected times during a broadcast period, said substitute programming, said remotely disposed enabling means having a telephone number associated therewith,
each of said households further including means for establishing a telephonic connection between said control means and said remotely disposed enabling means,
said special television signal including said telephone number of said remotely disposed enabling means to enable said control means after a power failure to contact said remotely disposed enabling means.

37. A marketing research system as recited in claim 36 wherein said special television signal is transmitted continuously.

38. A method of performing marketing research in a test area comprising the steps of
selecting a plurality of cooperating households having television receivers in the test area for participation in said marketing research, each cooperating household having means for receiving normal television signals including regularly scheduled programming available in said test area,
transmitting a special television signal including substitute programming to each cooperating household in the test area, each cooperating household having means for receiving said special television signal, and utilizing a computer remotely located from said households to communicate with each cooperating household over a telephone link concerning the display of either said regularly scheduled programming or said substitute programming on the television receiver in said cooperating household, including a telephone number associated with said computer in said special television signal to enable each household to contact said computer after a power failure.

39. A method of performing marketing research as recited in claim 38 wherein said telephone number is included in a digital data portion of said special television signal.

40. A method of performing marketing research as recited in claim 39 wherein said special television signal is transmitted continuously.

41. A marketing research system comprising a plurality of cooperating households in a test area, each of said households including a television receiver and normal television signal receiving means for delivering normal television signals including regularly scheduled programming to each household, means for delivering a special television signal including substitute programming to said households, said special television signal including a time of day signal, computer means in each of said households for automatically enabling said television receiver in each of said households to display either said regularly scheduled programming or said substitute programming and means for enabling said time of day signal to be available to said computer means in each of said households for use by said computer means in the event of a power failure.

42. A marketing research system as recited in claim 41 wherein said special television signal is transmitted continuously.

43. A marketing research system as recited in claim 41 wherein said time of day signal is included in a digital data portion of said special television signal.

44. A method of performing marketing research in a test area comprising the steps of selecting a plurality of cooperating households having television receivers in the test area for participation in said marketing research, each cooperating household having means for receiving normal television signals including regularly scheduled programming available in said test area, transmitting a special television signal including substitute programming to each cooperating household in the test area, said special television signal including a time of day signal, each cooperating household having means for receiving said special television signal, utilizing a computer in each cooperating household to enable the display of either said regularly scheduled programming or said substitute programming on the television receiver in said cooperating household and providing said time of day signal to said computer in each cooperating household for use by said computer in the event of a power failure.

45. A marketing research system comprising a plurality of cooperating households, each of said households including a television receiver and a normal television signal receiving means for delivering normal television signals including regularly scheduled programming to each household, special television signal transmission means for delivering a special television signal to said households, said special television signal including digitally encoded text and sound, each of said households having means for receiving said special television signal and means for automatically enabling the broadcast by said television receiver in at least one of said households of at least one of said text and sound in place of said regularly scheduled programming, means for storing information indicative of the material actually broadcast by said television receiver in each of said households for subsequent marketing research analysis.

46. A marketing research system comprising a plurality of cooperating households, each of said households including a television receiver and a normal television signal receiving means for delivering normal television signals including regularly scheduled programming to each household, special television signal transmission means for delivering a special television signal to said households, said special television signal including an audio subcarrier having digitally encoded text, each of said households having means for receiving said special television signal and means for automatically enabling the broadcast by said television receiver in at least one of said households of said text in place of said regularly scheduled programming, and means for storing information indicative of the material actually broadcast by said television receiver in each of said households for subsequent marketing research analysis.

47. A marketing research system comprising a plurality of cooperating households, each of said households including a television receiver and a normal television signal receiving means for delivering normal television signals including regularly scheduled programming to each household, special television signal transmission means for delivering a special television signal to said households, said special television signal including an audio subcarrier having digitally encoded sound, each of said households having means for receiving said special television signal and means for automatically enabling the broadcast by said television receiver in at least one of said households of said sound in place of said regularly scheduled programming and means for storing information indicative of the material actually broadcast by said television receiver in each of said households for subsequent marketing research analysis.

48. A marketing research system comprising a plurality of cooperating households, each of said households including a television receiver and a normal television signal receiving means for delivering normal television signals including regularly scheduled programming to each household, special television signal transmission means for delivering a special television signal to said households, said special television signal including an audio subcarrier having digitally encoded text and sound, each of said households having means for receiving said special television signal and means for automatically enabling the broadcast by said television receiver in at least one of said households of at least one of said text and sound in place of said regularly scheduled programming and means for storing information indicative of the material actually broadcast by said television receiver in each of said households for subsequent marketing research analysis.

49. A system for performing marketing research in a test area comprising normal television signal receiving means for delivering normal television signals including regularly scheduled programming to each of a plurality of cooperating households in said test area, each of said households having a television receiver, special television signal transmission means for delivering over-the-air to each of said households a special television signal that may include substitute programming, first control means in each of said households for automatically controlling the television receiver in said household to display either said regularly scheduled programming or said substitute programming and second control means remotely disposed from said households for individually addressing each of said first control means in each of said households and for programming on an individual basis each of said first control means in each of said households to display either said regularly scheduled programming or said substitute programming on said television receiver in each of said households, said first control means comprising a stored program household computer disposed in each of said households and said second control means comprising a test area stored program computer containing stored substitute programming instructions in the form of a substitution event schedule that identifies which one or more of said households are to participate in a substitution event during a broadcast period, a substitution event constituting the display of said substitute programming on said television receiver in one or more of said households, said first control means including contacting means for interconnecting said household computer to said test area computer to enable programmed instructions to be transmitted from said test area computer to said household computer including a substitution event schedule individually organized for each household for programming said first control means for an entire broadcast period to participate in or abstain from substitution events during said broadcast period, said household computer including video and sound generators to enable the display of alternate programming in the form of text and sound on said television receiver.

50. A system as recited in claim 49 wherein said switch may be placed in one of three switch conditions, said regularly scheduled programming being delivered to said television receiver through said switch in a first switch condition, said substitute programming being delivered to said television receiver through said switch in a second switch condition and said text and sound being delivered to said television receiver through said switch in a third switch condition.

51. A system for performing marketing research in a test area comprising normal television signal receiving means for delivering normal television signals including regularly scheduled programming to each of a plurality of cooperating households in said test area, each of said households having a television receiver, special television signal transmission means for delivering over-the-air to each of said households a special television signal that may include substitute programming, first control means in each of said households for automatically controlling the television receiver in said household to display either said regularly scheduled programming or said substitute programming and second control means remotely disposed from said households for individually addressing each of said first control means in each of said households and for programming on an individual basis each of said first control means in each of said households to display either said regularly scheduled programming or said substitute programming on said television receiver in each of said households, said first control means comprising a stored program household computer disposed in each of said households and said second control means comprising a test area stored program computer containing stored substitute programming instructions in the form of a substitution event schedule that identifies which one or more of said households are to participate in a substitution event during a broadcast period, a substitution event constituting the display of said substitute programming on said television receiver in one or more of said households, said first control means including contacting means for interconnecting said household computer to said test area computer to enable programmed instructions to be transmitted from said test area computer to said household computer including a substitution event schedule individually organized for each household for programming said first control means for an entire broadcast period to participate in or abstain from substitution events during said broadcast period, said second control means including a telephone having a telephone number and wherein said special television signal is transmitted continuously over-the-air and includes the time of day and said telephone number.

52. A marketing research system comprising a first stored program computer for controlling the operation of said system in a test area, said first computer including a household database containing the identifications of individual cooperating households in said test area and a second database comprising a schedule of substitution events that are to occur during a broadcast period, each of said households including a television receiver and a normal television signal receiving means for delivering normal television signals including regularly scheduled programming to each household, special television signal transmission means for delivering over-the-air a special television signal, including substitute programming, to said households, each of said households having both special television signal receiving means for receiving said special television signal and a second stored program computer capable of being periodically interconnected with said first stored program computer to receive and store an individually organized schedule of substitution events for controlling the display on said television receiver in said household of either said regularly scheduled programming or said substitute programming, a substitution event constituting the display of said substitute programming on said television receiver at a specific time, each of said households further including switch means interconnected between said second computer and said television receiver, said switch means being capable of being switched by said second computer to deliver either said regularly scheduled programming or said substitute programming to said television receiver, said second computer including means for generating video and sound signals for delivery through said switch means to said television receiver as alternate programming, said switch means being capable of being switched by said second computer to deliver either said regularly scheduled programming or said substitute programming or said alternate programming to said television receiver.

53. A system for performing marketing research in a test area comprising normal television signal receiving means for delivering normal television signals including regularly scheduled programming to each of a plurality of cooperating households in said test area, each of said households having a television receiver, special television signal transmission means for delivering over-the-air to each of said households a special television signal that may include substitute programming, first control means in each of said households for automatically controlling the television receiver in said household to display either said regularly scheduled programming or said substitute programming and second control means remotely disposed from said households for individually addressing each of said first control means in each of said households and for programming on an individual basis each of said first control means in each of said households to display either said regularly scheduled programming or said substitute programming on said television receiver in each of said households, said first control means comprising a stored program household computer disposed in each of said households and said second control means comprising a test area stored program computer containing stored substitute programming instructions in the form of a substitution event schedule that identifies which one or more of said households are to participate in a substitution event during a broadcast period, a substitution event constituting the display of said substitute programming on said television receiver in one or more of said households, said first control means including contacting means for interconnecting said household computer to said test area computer to enable programmed instructions to be transmitted from said test area computer to said household computer including a substitution event schedule individually organized for each household for programming said first control means for an entire broadcast period to participate in or abstain from substitution events during said broadcast period, said special television signal including sound digitally encoded in a digital data portion of said special television signal.

54. A system as recited in claim 53 wherein said household computer includes means for storing said sound and also includes sound output means for enabling said sound to be broadcast by said television receiver, the broadcast of said sound by said television receiver being controlled by said first control means.

55. A system for performing marketing research in a test area comprising normal television signal receiving means for delivering normal television signals including regularly scheduled programming to each of a plurality of cooperating households in said test area, each of said households having a television receiver, special television signal transmission means for delivering over-the-air to each of said households a special television signal that may include substitute programming, first control means in each of said households for automatically controlling the television receiver in said household to display either said regularly scheduled programming or said substitute programming and second control means remotely disposed from said households for individually addressing each of said first control means in each of said households and for programming on an individual basis each of said first control means in each of said households to display either said regularly scheduled programming or said substitute programming on said television receiver in each of said households, said first control means comprising a stored program household computer disposed in each of said households and said second control means comprising a test area stored program computer containing stored substitute programming instructions in the form of a substitution event schedule that identifies which one or more of said households are to participate in a substitution event during a broadcast period, a substitution event constituting the display of said substitute programming on said television receiver in one or more of said households, said first control means including contacting means for interconnecting said household computer to said test area computer to enable programmed instructions to be transmitted from said test area computer to said household computer including a substitution event schedule individually organized for each household for programming said first control means for an entire broadcast period to participate in or abstain from substitution events during said broadcast period, said special television signal including text and sound digitally encoded in a digital data portion of said special television signal.

56. A system as recited in claim 55 wherein said household computer includes means for storing said text and sound and also includes video and sound output means for enabling said text to be displayed on said television receiver and said sound to be broadcast by said television receiver, the display of said text on said television receiver and the broadcast of said sound by said television receiver being controlled by said first control means.

57. A marketing research system comprising first stored program computer means for controlling the operation of said system in a test area, said first computer means including a household database containing the identifications of individual cooperating households in said test area and a second database comprising a schedule of substitution events that are to occur during a broadcast period, each of said households including a television receiver and a normal television signal receiving means for delivering normal television signals including regularly scheduled programming to each household, special television signal transmission means for delivering a special television signal to said households, said special television signal including digital data in the form of digitally encoded text and sound, each of said households having both means for receiving said special television signal and second stored program computer means capable of being periodically connected to said first stored program computer means for receiving and storing an individually organized schedule of substitution events for controlling the broadcast by said television receiver in said household of either said regularly scheduled programming or at least one of said text and sound, a substitution event constituting the broadcast of at least one of said text and sound by said television receiver at a specific time.

* * * * *